(12) United States Patent
Zalewski (10) Patent No.: US 11,666,822 B2
(45) Date of Patent: *Jun. 6, 2023

(54) USER-BASED MINI-GAME GENERATION AND DISTRIBUTION

(71) Applicant: Sony Interactive Entertainment LLC, San Mateo, CA (US)

(72) Inventor: Gary M. Zalewski, Oakland, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,968

(22) Filed: Jul. 13, 2021

(65) Prior Publication Data

US 2021/0339129 A1 Nov. 4, 2021

Related U.S. Application Data

(63) Continuation of application No. 16/564,854, filed on Sep. 9, 2019, now Pat. No. 11,058,947, which is a continuation of application No. 13/792,664, filed on Mar. 11, 2013, now Pat. No. 10,406,429.

(60) Provisional application No. 61/694,718, filed on Aug. 29, 2012.

(51) Int. Cl.
*A63F 13/352* (2014.01)
*A63F 13/60* (2014.01)
*A63F 13/497* (2014.01)
*A63F 13/88* (2014.01)

(52) U.S. Cl.
CPC .......... *A63F 13/352* (2014.09); *A63F 13/497* (2014.09); *A63F 13/60* (2014.09); *A63F 13/88* (2014.09)

(58) Field of Classification Search
USPC ........................................................ 463/24
See application file for complete search history.

(56) References Cited

U.S. PATENT DOCUMENTS

| | | | |
|---|---|---|---|
| 9,358,461 B2 * | 6/2016 | Perry | A63F 13/63 |
| 2008/0039197 A1 * | 2/2008 | Walker | G07F 17/32 463/30 |
| 2010/0167809 A1 * | 7/2010 | Perlman | H04N 21/2381 463/43 |
| 2014/0179424 A1 * | 6/2014 | Perry | A63F 13/86 463/31 |
| 2014/0179425 A1 * | 6/2014 | Perry | A63F 13/86 463/31 |
| 2017/0282073 A1 * | 10/2017 | Kurabayashi | A63F 13/352 |

(Continued)

*Primary Examiner* — Pierre E Elisca
(74) *Attorney, Agent, or Firm* — Penilla IP, APC (57) ABSTRACT

A computer-implemented methods for generating a mini-game are provided. One method includes recording gameplay of a game on a computer game system and receiving a signal to generate said mini-game, and responsive to said signal suspending play of the game. The method includes identifying a start point and an end point for the mini-game from the recorded game, and using said start point and said end point for generating executable instructions to enable play of the mini-game. The method includes saving said generated executable instructions to a distribution system. The distribution system includes at least one server to enable access to the mini-game to access said generated executable instructions. And, selection of the generated executable instructions enables interactive gameplay of the mini-game.

10 Claims, 5 Drawing Sheets

(56) References Cited

U.S. PATENT DOCUMENTS

| | | | |
|---|---|---|---|
| 2017/0354884 A1* | 12/2017 | Benedetto | A63F 13/493 |
| 2018/0021684 A1* | 1/2018 | Benedetto | A63F 13/86 463/24 |
| 2018/0104587 A1* | 4/2018 | Zachwieja | A63F 13/497 |
| 2019/0240572 A1* | 8/2019 | Perry | A63F 13/493 |
| 2020/0197799 A1* | 6/2020 | Perry | A63F 13/86 |
| 2020/0206625 A1* | 7/2020 | Perry | A63F 13/493 |

* cited by examiner

USER-BASED MINI-GAME GENERATION AND DISTRIBUTION

CLAIM OF PRIORITY

This application is a Continuation of U.S. patent application Ser. No. 16/564,854, filed Sep. 9, 2019 (U.S. Pat. No. 11,058,947, issued on Jul. 13, 2021), and entitled User-Based Mini-Game Generation and Distribution," which is a further Continuation of U.S. patent application Ser. No. 13/792,664 filed Mar. 11, 2013 (U.S. Pat. No. 10,406,429, issued on Sep. 10, 2019), the entire disclosures of which are incorporated herein by reference. U.S. patent application Ser. No. 13/792,664 is a nonprovisional of U.S. Provisional Patent Application No. 61/694,718, filed Aug. 29, 2012, the entire disclosures of which are incorporated herein by reference.

CROSS-REFERENCE TO RELATED APPLICATION

This application is related to commonly-assigned, provisional application Ser. No. 61/666,628, filed the same day as the present application, and entitled "DETERMINING TRIGGERS FOR CLOUD-BASED EMULATED GAMES", the entire disclosures of which are incorporated herein by reference.

This application is related to commonly-assigned, provisional application Ser. No. 61/666,645, filed the same day as the present application, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, provisional application Ser. No. 61/666,665, filed the same day as the present application, and entitled "CONVERSION OF HAPTIC EVENTS INTO SCREEN EVENTS", the entire disclosures of which are incorporated herein by reference.

This application is related to commonly-assigned, provisional application Ser. No. 61/666,679, filed the same day as the present application, and entitled "SUSPENDING STATE OF CLOUD-BASED LEGACY APPLICATIONS", the entire disclosures of which are incorporated herein by reference.

FIELD OF THE DISCLOSURE

The present disclosure is related to video games. Among other things, this disclosure describes a method and apparatus for generating, distributing, and playing mini-games.

BACKGROUND OF THE INVENTION

Finding new ways to play preexisting video games can increase the longevity of older games. Instead of replaying the same level or completing the same missions repeatedly, gamers often desire new challenges when replaying legacy games. In response to this need, game designers have begun to produce mini-games. Within a mini-game, the gamer can be instructed to complete new objectives or challenge their friends for high scores in a format that was not originally designed into the legacy game. Further, since the mini-game is derived from an existing game, gamers already know the characters and basic components of the game, and are therefore more likely to play the mini-game.

Mini-games often do not begin at traditional starting points that were used in the original game. For example, the mini-game may begin near the end of a level, just prior to facing a final opponent, or the boss of the level. A boss is an enemy-based challenge which is found in many video games. Bosses are generally seen at the climax of a particular section of the game, usually at the end of a stage or level. Due to the climactic nature of fighting a boss, mini-game designers may choose to use this section of the game as their starting point. In order to make the mini-game more challenging than the original version, the game designer may also want to limit the number of lives a player may use, or change other game parameters such as the amount of health the main character has remaining. Other game scenarios may be chosen as starting points for a min-game. For example a mini-game may begin with the game player being the batter in a baseball game where there are two outs in the bottom of the ninth inning and the batter's team is down by one run.

However, in order to generate mini-games that start with these specific circumstances a game designer must reverse engineer the underlying code in each game and then rewrite the code to enable the mini-game to start under these specific conditions. This process is time consuming and expensive, because it may require multiple engineers to redevelop a single legacy game. Additionally since mini-games are shorter than full-length games, there is a need to produce mini-games in larger quantities.

It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Aspects of the present disclosure include methods and apparatus that allow individual gamers to create, distribute, and play their own mini-games. Mini-game data can be generated and distributed using middleware that generates mini-game based on game play with an existing game title. The mini-games may be created through use of a software add-on that records relevant game data as a gamer plays an existing game. According to other aspects, certain methods and apparatus may also allow any gamer to remotely access and play such mini-games using mini-game data and middleware in conjunction with the existing game title.

In order to create mini-games without reverse engineering and recoding, middleware may be configured that allows gamers to produce, distribute, and play mini-games without having to dig into the code of an existing game.

Figure 1:
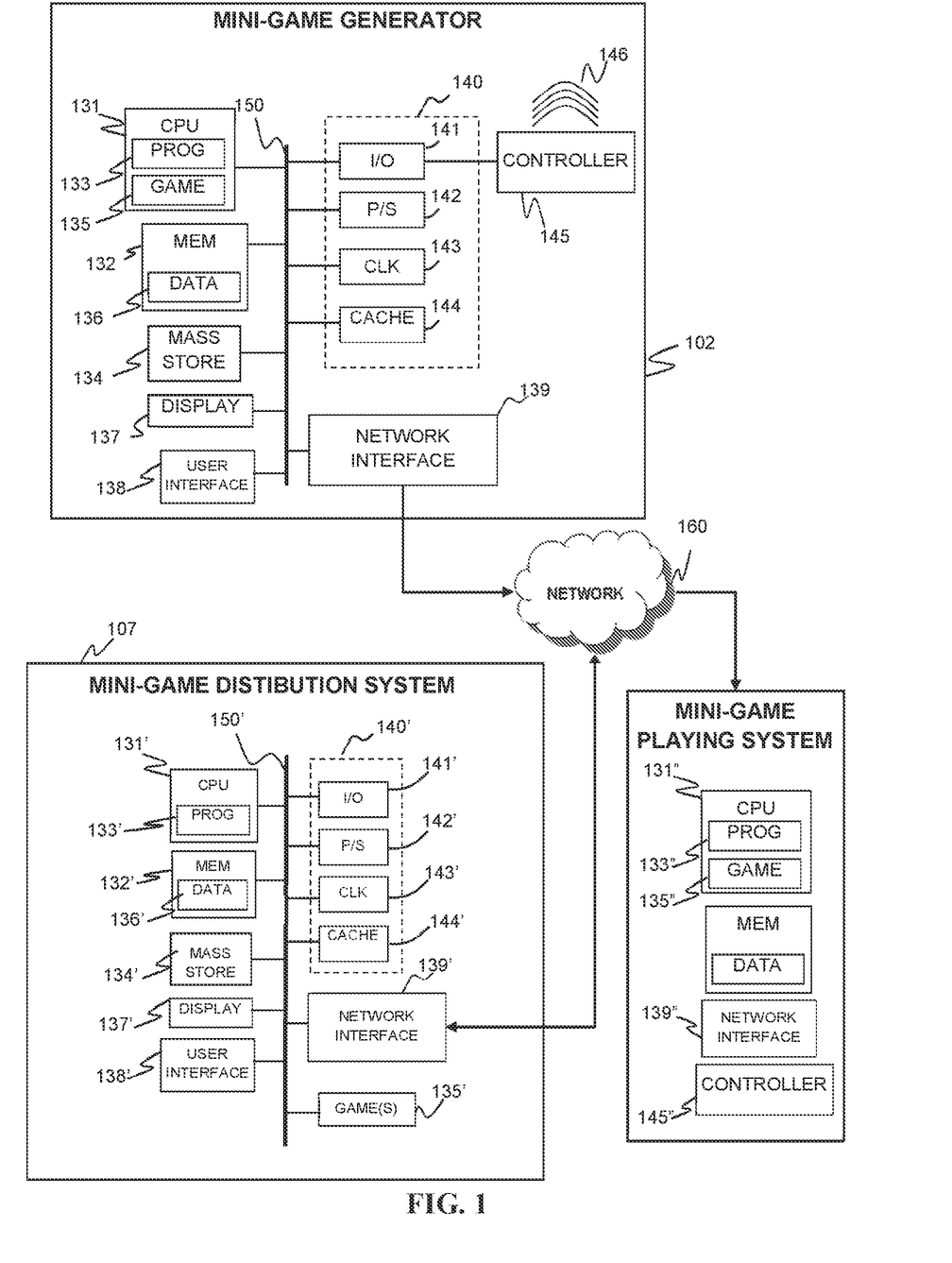
FIG. 1 is a schematic diagram illustrating mini-game generator, mini-game distribution system, and mini-game playing system according to various aspects of the present disclosure.

FIG. 1A is a schematic diagram illustrating components that can interact to implement mini-game generation, distribution, and play according various aspects of the present disclosure. One or more mini-game generators 102 may access one or more mini-grime distribution systems 107 over a network 160, which may be, e.g., a local area network (LAN) or a wide area network (WAN). One or more mini-game playing systems 109 may access the mini-game distribution system 107 via the network 160. The mini-game generator 102 and mini-game playing system 109 may be similarly configured or even substantially identical to each other. Additionally, the mini-game generator 102 may be contained within the mini-game distribution system 107 and may communicate directly with the mini-game playing systems 109 over the network 160.

The mini-game generator 102 may include a central processor unit (CPU) 131. By way of example, a CPU 131 may include one or more processor cores, which may be configured according to, e.g., a dual-core, quad-core, multi-core, architecture. Alternatively, the CPU may be based on an architecture that uses one or more main processor cores in conjunction with one or more co-processor cores, such as a Cell processor architecture. The mini-game generator 102 may also include a memory 132 (e.g., RAM, DRAM, ROM, and the like). The CPU 131 may execute a mini-game generation program 133, portions of which may be stored in the memory 132 along with mini-game data 136. A game program 135 may also be stored in the memory 132 and executed on the CPU 131. The mini-game program 133 may be configured as middleware that operates in conjunction with one or more game programs 135 to generate a mini-game from game play with the game program.

The mini-game generator 102 may also include well-known support circuits 140, such as input/output (I/O) circuits 141, power supplies (P/S) 142, a clock (CLK) 143 and cache 144. The mini-game generator 102 may optionally include a mass storage device 134 such as a disk drive, CD-ROM drive, tape drive, or the like to store programs and/or data. The mini-game generator 102 may also optionally include a display unit 137 and a user interface unit 138 to facilitate interaction between the mini-game generator 102 and a user who requires direct access to the mini-game generator 102. The display unit 137 may be in the form of a cathode ray tube (CRT) or flat panel screen that displays text, numerals, or graphical symbols. The user interface unit 138 may include a keyboard, mouse, joystick, touch pad, touch screen, or other device. A controller 145 may be connected to the mini-game generator 102 through the I/O circuit 141 or it may be directly integrated into the mini-game generator 102. The controller 145 may facilitate interaction between the mini-game generator 102 and a user. The controller 145 may include a keyboard, mouse, joystick, light pen, hand-held controls or other device. The controller 145 is also may be capable of generating a haptic response 146. By way of example and not by way of limitation, the haptic response 146 may be vibrations or any other feedback corresponding to the sense of touch. The mini-game generator 102 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The mini-game generator 102 may send and receive data and/or requests for files via one or more data packets over the network 160.

The preceding components may exchange signals with each other via an internal system bus 150. The snapshot generator 102 may be a general purpose computer that becomes a special purpose computer when running code that implements embodiments of the present invention as described herein.

The mini-game generator 102 may be a general purpose computer that becomes a special purpose computer when running code that implements mini-game generation methods according to certain aspects of the present invention as described herein. By way of example, and not by way of limitation, the mini-game generator 102 may be an electronic gaming device, such as a game console or portable gaming device. Furthermore the mini-game generator may be a suitable configured general-purpose electronic device, such as a smartphone, personal computer, laptop, tablet computer that is configured to implement mini-game generation through appropriate programming.

The mini-game distribution system 107 may include a central processor unit (CPU) 131'. By way of example, a CPU 131' may include one or more processors, which may be configured according to, e.g., a dual-core, quad-core, multi-core, or processor-co-processor (e.g., Cell processor) architecture. The mini-game distribution system 107 may also include a memory 132' (e.g., RAM, DRAM, ROM, and the like). The CPU 131' may execute a mini-game distribution program 133', portions of which may be stored in the memory 132' along with mini-game data 136'. The emulator 107 may also include well-known support circuits 140', such as input/output (I/O) circuits 141', power supplies (P/S) 142', a clock (CLK) 143' and cache 144'. The mini-game distribution system 107 may optionally include a mass storage device 134' such as a disk drive, CD-ROM drive, tape drive, or the like to store programs and/or data, including mini-game data and or game programs. The mini-game distribution system 107 may optionally include a display unit 137' and user interface unit 138' to facilitate interaction between the mini-game distribution system 107 and a user. The display unit 137' may be in the form of a cathode ray tube (CRT) or flat panel screen that displays text, numerals, or graphical symbols. The user interface unit 138' may include a keyboard, mouse, joystick, touch pad, touch screen, or other device. The mini-game distribution system 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The mini-game distribution system 107 may be a general purpose computer that becomes a special purpose computer when running code that implements methods according to certain aspects of the present disclosure as described herein.

The mini-game playing system 109 may be configured substantially the same as the mini-game generator 102. In particular, the mini-game playing system 109 may include a CPU 131", a memory 132", a network interface 139" and a controller 145". One or more game programs 135" and data 136 (e.g., mini-game data) may be stored in the memory along with a mini-game playing program 133" which may be executed by the CPU 131". Other components that the mini-game playing system 109 may have in common with the mini-game generator 102 are omitted for the sake of clarity. However, components of the mini-game generator described above may be regarded as being included with the mini-game play system 109 as if set forth explicitly herein. The mini-game playing system 109 may be a general purpose computer that becomes a special purpose computer when running code that implements mini-game playing methods according to certain aspects of the present disclosure as described herein. By way of example, and not by way of limitation, the mini-game playing system 109 may be an electronic gaming device, such as a game console or portable gaming device.

The mini-game distribution system 107 and mini-game playing system 109 may have access to one or more game programs 135' that are associated with mini-games generated by the mini-game generator 102. There may be more than one game program 135' stored in the mini-game distribution system 107. The games may also be stored in the memory or in the mass storage device. Additionally, one or more games 135' may be stored at a remote location accessible to the mini-game generator 102 or mini-game distribution system 107 over the network 160.

Figure 2:
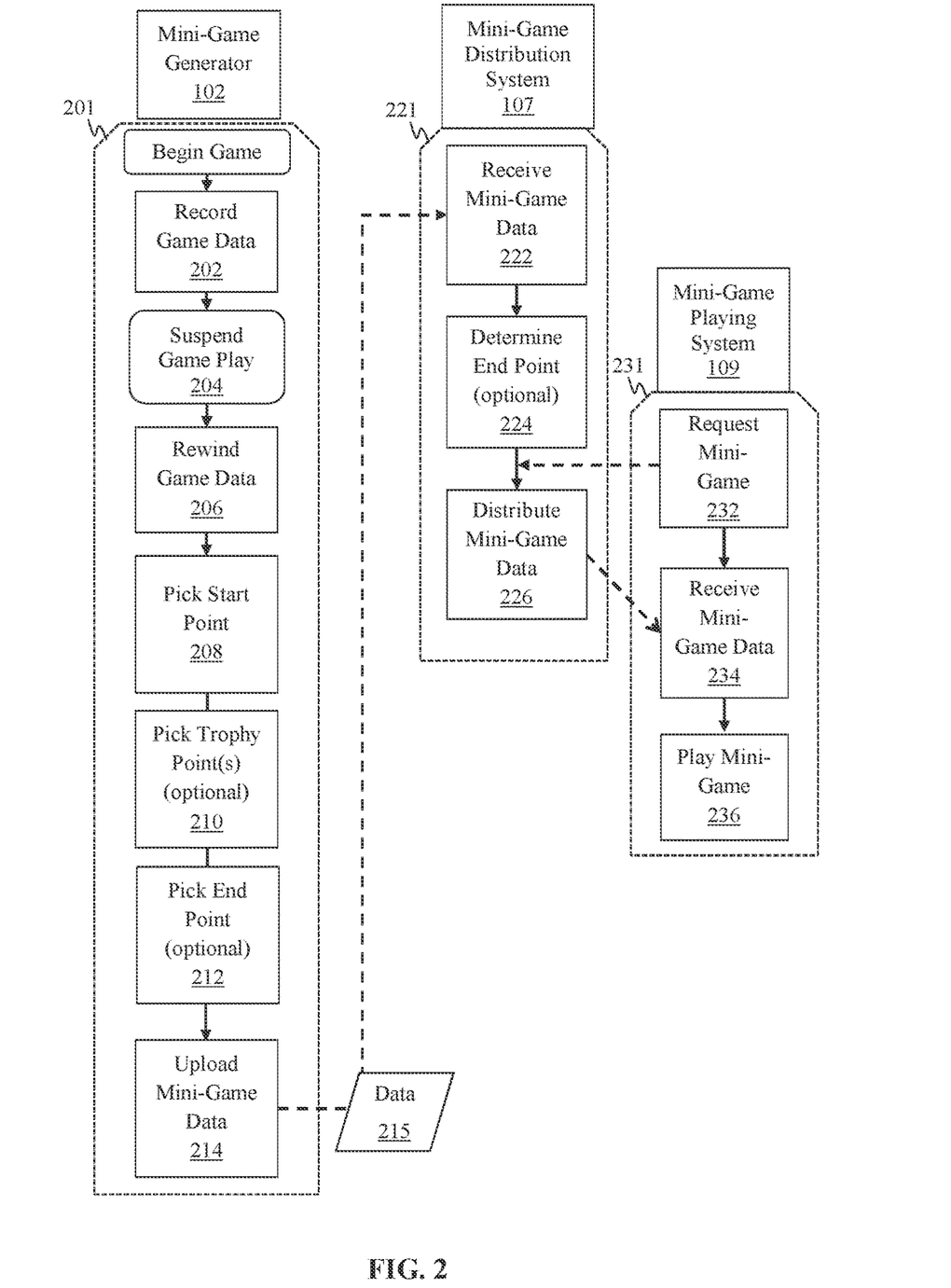
FIG. 2 is a flow diagram illustrating methods of generating, distributing, and playing mini-games according to various aspects of the present disclosure.

As shown in FIG. 2, the mini-game generator 102 may be configured to implement a method 201 for generating a mini-game. The mini-game distribution system 107 may be configured to implement a method 221 for distributing a mini-game and the mini-game playing system 109 may be configured to implement a method 231 for playing a mini-game. Various aspects of these methods may be implemented by execution of computer executable instructions running on the mini-game generator 102 and/or the mini-game distribution system 107 in conjunction with the actions of a mini-game generator 102. Certain other aspects may be implemented by execution of computer executable instructions running on the mini-game playing system 109. In FIG. 2 the dashed arrows represent the flow of data among the mini-game generator 102, the mini-game distribution system 107 and the mini-game playing system 109.

Referring to the method 201 for generating a mini-game, game data is recorded after a game begins. The user who generates the mini-game (hereinafter referred to as the generating user) plays the game normally. When the game begins, the mini-game generator system 102 may record game data, as indicated at 202. By way of example, the mini-game generator may initially record data such as the initial game state, difficulty level, game level, game character attributes (e.g., lives, possessions, weapons, and the like). As game play progresses, images of the game action may be displayed on the display 137. Game inputs from the generating user, (e.g., button presses or joystick positions of a game controller or other interface) may also be recorded. The mini-game generator 102 need not record every position of every character and object in the game so long as the data that is recorded is sufficient to reproduce the game action perceived by the generating user in conjunction with the standard software and data associated with the game title.

At any point in the progress of game play, the generating user may want to suspend game play so that a mini-game can be generated starting from some point between when the game began and when the game was suspended. For example, the generating user may have defeated the boss character in a game in a particularly manner after the player's avatar entered a particular room carrying particular weapons or other objects. The user would like to generate a mini-game starting from the point that the avatar entered the room. To accomplish this, the program 133 may be configured to suspend the game play, as indicated at 204 in response to an input from the generating user. The game state at the point of suspension may be recorded, and the game may be rewound in response to an input from the generating user using the recorded game data, as indicated at 206. The mini-game generator program 133 may be configured to allow the generating user to run the game program 135 in reverse from the point that the game was suspended. The rewound game action may be displayed on the display 136 as the game runs in reverse. When the generating user finds a suitable place in the rewound game action, a starting point may be chosen with an input from the generating user, as indicated at 208.

Figure 3A:
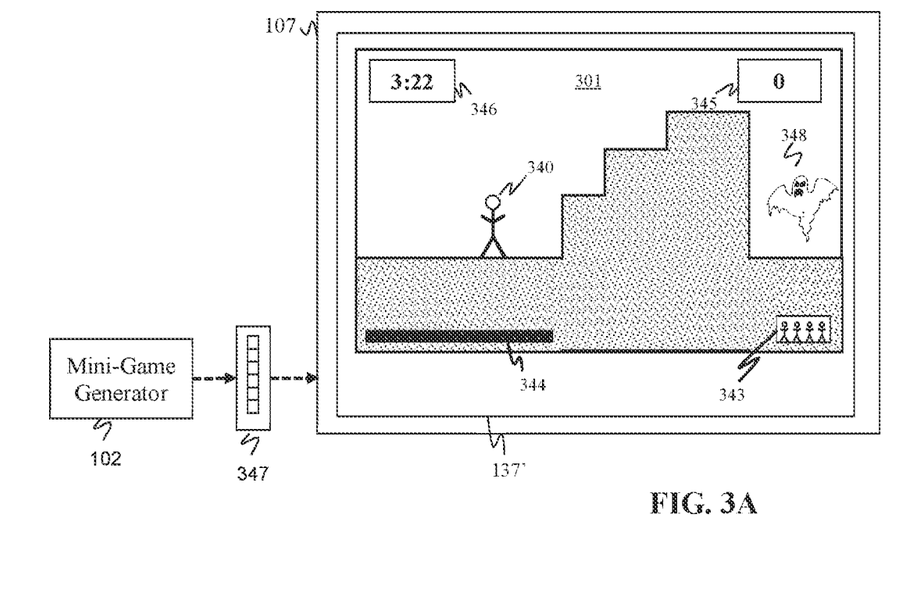
FIGS. 3A-3B are schematic diagrams illustrating an example of a mini-game generator generating mini-game data according to an aspect of the present disclosure.
Figure 3B:
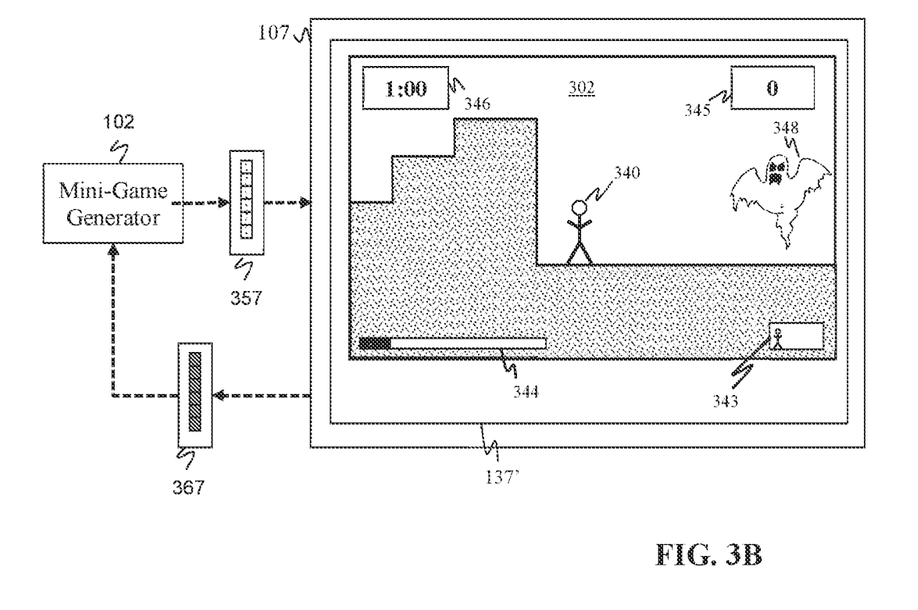

FIGS. 3A-3B illustrate an example of how the mini-game generator 102 may record the game data at 202 and suspend game play at 204. The game data in the form of game inputs 347 that direct the movements and/or other actions of player characters (avatars) during the course of the game. The game inputs 347 may include commands that are generally used by a game player to advance the game program 135 from a first state 301 to a second state 302. The first state 301 may be stored as a first snapshot, and the second state 302 may be the desired location for the generated snapshot. The game inputs 347 may be recorded from input signals from the controller 145, or they may be automatically generated by the mini-game generator 102. Game inputs 347 may include, but are not limited to, inputs that cause a main character 340 in an existing game 135 to move to a new position, swing a sword, select an item from a menu, or any other action that can take place during the game play of the game 135. Additionally, while game inputs advance the game play of the game from a first state 301 to a second state 302, there may also be one or more intermediate states generated. Each of the intermediate states may optionally be recorded as a snapshot 367 as well.

FIG. 3A depicts the mini-game generator 102 recording game inputs 347. Images corresponding to the first state 301 of the legacy game 135 may be displayed on the display unit 137. According to this example, the first state 301 includes the main character 340 standing on the left side of the mountain and the final boss 348 standing on the right side of the mountain. Additionally, the main character 340 has four lives 343 remaining and his health bar 344 is full. The time remaining to complete the level 346 is displayed on the top left corner of the display unit 137 and the score 345 is displayed on the top right corner of the display unit 137.

The mini-game generator 102 records the game inputs 347 as the game is advanced to a second state 302 as shown in FIG. 3B. In the second state 302, the main character 340 has been moved to the right side of the mountain and is proximate to the final boss 348. Also, in this example, the time remaining to complete the level 346 has been reduced to 1:00. Additionally, a health bar 344 indicates that the main character has limited health, and finally, there is only 1 life 343 remaining. This information may be recorded by the mini-game generator 102 if relevant.

If the generating user determines that the second state 302 corresponds to a suitable endpoint for a mini-game the generating user may enter a command that causes the mini-game program 133 to deliver a game suspension request 357 to the mini-game generator 107. By way of example, and not by way of limitation, game suspension request 357 may be automatically generated by the snapshot generator 102 under pre-defined circumstances, e.g., if the boss character has been defeated. Alternatively, generating user may initiate the legacy game suspension request 357 with a keystroke from the user interface 138 or a button press or joystick movement with the controller 145.

The mini-game generator 102 may suspend the game and generate the snapshot when every device relevant to the game 135 is in a steady state. Waiting for all of the devices to come into a steady state may take as little as one frame to accomplish. Once the devices are in a steady state, the stored data may be platform independent since it does not rely on any specific set of hardware. This enables the snapshot to be used in conjunction with any target platform. The devices relevant to the game 135 may be a steady state when there are no outstanding disk requests and all asynchronous activity has been synchronized. By way of example, and not by way of limitation, these conditions may be met when the mini-game generator 102 has finished processing a basic block. Once the game 135 has been suspended, the mini-game generator 102 may proceed to record the state of every device that is being emulated. By way of example, and not by way of limitation, the emulator may record the state of the CPU, GPU, memory, register values, program counter value, programmable DMA state, buffered data for the DMA, audio chip state, and CD-ROM state. After the snapshot has been generated, the mini-game generator 102 may store the snapshot in memory 132.

By way of example, and not by way of limitation, the mini-game generator program 133 may present the user with a control dashboard on the display 137 that the generating user can manipulate using the controller 145. By selecting various controls on the dashboard, the generating user can control the speed and direction with which the recorded game play is reviewed and choose the starting point. It is noted that the mini-game generator 102 may generate a snapshot in a similar fashion when the generating user enters a command to record the mini-game starting point at 208.

When the starting point is chosen, the mini-game generator program 133 may record the state of the game program 135 at the starting point bundles relevant state data as mini-game data 215. The relevant state data is generally sufficient to allow the game program 135 to resume play of the game starting at the point selected by the generating user. In addition to the starting state, the mini-game data 215 may optionally include information identifying the game title and/or version of the game program 135. The mini-game data 215 may optionally include information identifying the generating user. The relevant state data may include game level, game difficulty, character attributes, game character location, number of lives left, time counter value, and the like. Not all state data needs to be bundled as mini-game data, just data that is sufficient for the game program 135 to start the game at the point chosen by the generating user. Furthermore, the mini-game data 215 may optionally include some or all of the recorded game data, e.g., including information identifying inputs from the generating user and the timing of such inputs up to the point that the game was suspended. The mini-game data 215 may then be uploaded, e.g., to the mini-game distribution system 107 or, in some implementations, directly to a mini-game playing system 109.

According to some aspects of the present disclosure, the mini-game generator program 133 may optionally be configured to allow the generating user to pick intermediate trophy points, as indicated at 210. The intermediate trophy points may be included in the mini-game data 215. Examples of intermediate trophy points include points at which enemies are defeated, prizes captured, or obstacles overcome. The min-game generator 102 may allow the generating user to rewind or fast forward the game through the recorded game data and select points for use as trophy points. In addition, the mini-game generator program 133 may optionally be configured to allow the generating user to pick and end point for the mini-game, which may be included in the mini-game data. For example, the generating user may select the point at which the boss character is defeated as the endpoint. Alternatively, the end point may be defined in terms of an elapsed time from the starting point.

Furthermore, it is possible for the mini-game generator program 133 to determine the ending point automatically, e.g., by proceeding through the recorded game play and analyzing video events, audio events, or game system memory for indications of an end point. For example, the game program 135 may play a particular video when the boss character is defeated. The mini-game generator program 133 may be configured to detect playing of this video in the recorded game data to determine the endpoint. Similarly, the game program 135 may play a particular sound when the boss character is defeated and the mini-game generator program 133 may detect the playing of this sound from the recorded game data to determine the endpoint. Furthermore, data in the game system memory 132 may indicate the defeat of the boss character or other end point and the mini-game generator program may be configured to monitor the data in the memory 132 to determine the mini-game endpoint. For example, the game may require inflicting a certain amount of damage points on the boss character and the current level of damage may be stored in the memory 132. The mini-game generator program may monitor the memory location where the boss character damage points are stored to determine the endpoint.

Referring now to the mini-game distribution method 221, the mini-game distribution system 107 may receive the mini-game data 215, e.g., via the network 160. The mini-game data may be received in the form of one or more network data packets, from which the mini-game distribution program 133' may extract the mini-game data 215. The mini-game data may be stored in the memory 132' and/or mass storage 134' of the mini-game distribution system 107. As noted above, the mini-game data 215 may generally include sufficient data to allow a game program 135' to resume play of the game starting at the point selected by the generating user.

According to some aspects of the present disclosure, the mini-game distribution system 107 may determine the endpoint of the mini-game and/or trophy points, as indicated at 224. For example, if the mini-game data 215 includes recorded game inputs, the mini-game distribution program 133' may be configured to determine the end point and/or trophy points from analysis of the game action resulting from the game inputs when they are applied by the game program 135'. Alternatively, the mini-game data 215 may be received with the endpoint and/or intermediate trophy point data already bundled. The mini-game distribution system 107 may bundle information relating to the endpoint and/or intermediate points into distributable mini-game data 215'. The mini-game distribution program 133' may optionally be configured to bundle information identifying the generating user and/or the mini-game distribution system into the distributable mini-game data 215'. Once the relevant mini-game data are gathered, the mini-game distribution system 107 may distribute the mini-game data 215' to one or more game playing systems 109 as indicated at 226.

Referring now to the mini-game playing method 231 it is noted that the mini-game playing system may request the mini-game from the mini-game distribution system 107, as indicated at 232. It is also possible for the mini-game distribution system to distribute mini-games without request, e.g., if a mini-game playing system is part of a pre-established distribution list. The mini-game data 215' may be received at the mini-game playing system 109, e.g., via the network 160, as indicated at 234. It is noted that the mini-game playing system 109 may be configured in substantially the same way as the mini-game generating system, perhaps with slight differences in software and data. In such cases it may be possible for the mini-game playing system to automatically generate and endpoint and/or intermediate trophy points if the mini-game playing software 133" is configured to implement these functions.

Upon instruction from a user, the mini-game playing software 133" may begin playing the mini-game as indicated at 236. By way of example, and not by way of limitation, the mini-game playing software may load a game program 135" upon which the mini-game is based and load relevant game state data from the received mini-game data 215'. As noted above, the state data may be sufficient to start play of the game program 135" at the point selected by the generating user. Thus, when the user of the game playing system 109 starts the mini-game, the game may start at the exact same point as that selected by the generating user. The game-playing user starts the game, e.g., with the game characters in the locations and at the point in the action selected by the generating user. Game play may then proceed in accordance with the game program 135" in response to inputs from the game-playing user, e.g., via a game controller 145".

Figure 4A:
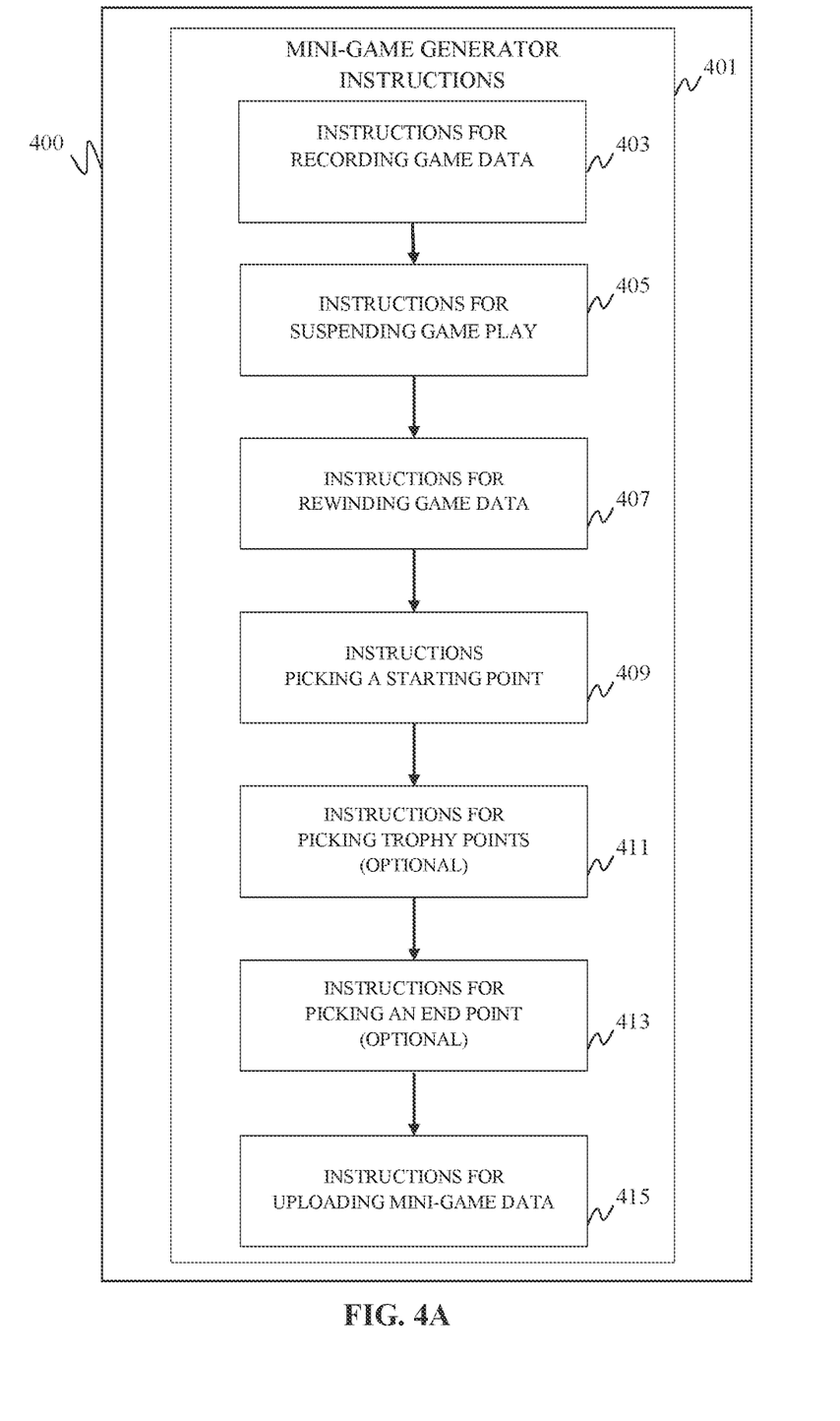
FIG. 4A is a block diagram illustrating a non-transitory computer-readable medium containing instructions for generating a mini-game according to an aspect of the present disclosure.

According to certain aspects of the present disclosure, the mini-game generator program 133, mini-game distribution program 133' and mini-game playing program 133" may be embodied as computer readable instructions in non-transitory computer-readable media. As shown in FIG. 4A, a set of mini-game generator instructions 401 may be implemented, e.g., by the mini-game generator 102, may be embodied in a non-transitory computer-readable medium 400 such as the memory 132 or the mass storage device 134 of the mini-game generator 102. The mini-game generator instructions 401 may also be part of the mini-game generator program 133. The mini-game generator instructions 401 may be configured to implement the mini-game generator method 201 when executed by the CPU 131 of the mini-game generator 102. The mini-game generator instructions 401 may include instructions for recording game input data 403, instructions for suspending game play 405, instructions for rewinding game data 407, instructions for picking mini-game starting point 409 and instructions for uploading mini-game data 415. The mini-game generator instructions 401 may optionally include instructions for picking an endpoint 411 and/or instructions for picking trophy points 413.

Figure 4B:
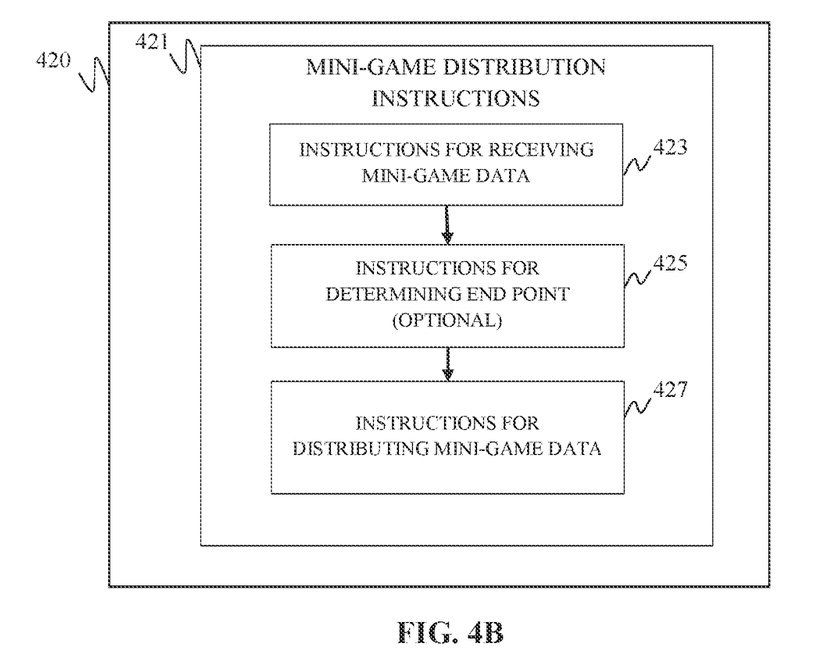
FIG. 4B is a block diagram illustrating a non-transitory computer-readable medium containing instructions for distributing a mini-game according to an aspect of the present disclosure.
Figure 4C:
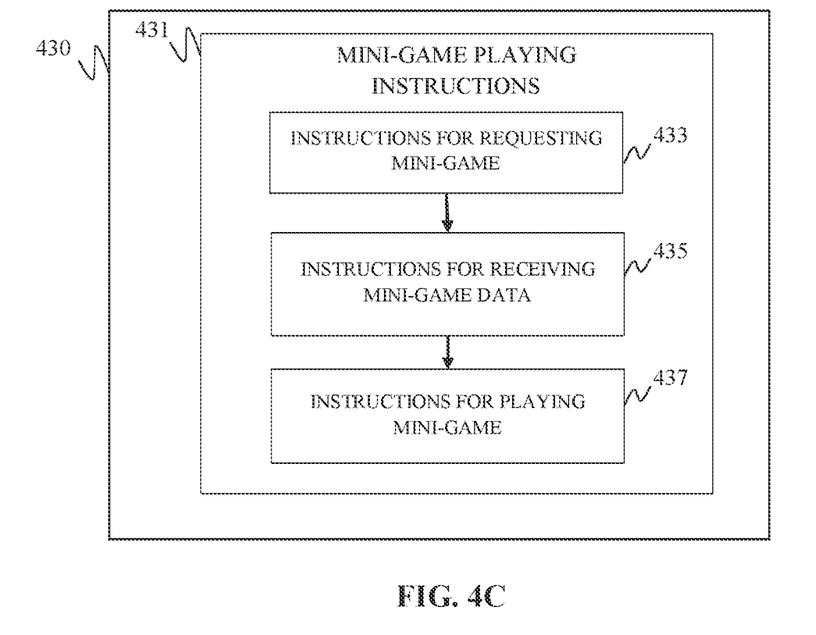
FIG. 4C is a block diagram illustrating a non-transitory computer-readable medium containing instructions for playing a mini-game according to an aspect of the present disclosure.

As shown in FIG. 4B, a set of mini-game distribution instructions 421 may be implemented, e.g., by the mini-game distribution system 107, may be embodied in a non-transitory computer-readable medium 420 such as the memory 132' or the mass storage device 134' of the mini-game distribution system 107. The mini-game distribution instructions 421 may also be part of the mini-game distribution program 133'. The mini-game distribution instructions 421 may be configured to implement the mini-game distribution method 221 when executed by the CPU 131' of the mini-game distribution system 107. The mini-game distribution instructions 421 may include instructions for receiving mini-game data 423, optional instructions for determining an endpoint or trophy points 425, and instructions for distributing mini-game game data 427.

As shown in FIG. 4B, a set of mini-game playing instructions 431 may be implemented, e.g., by the mini-game playing system 109, may be embodied in a non-transitory computer-readable medium 430 such as the memory 132" or the mass storage device 134" of the mini-game playing system 109. The mini-game playing instructions 431 may also be part of the mini-game playing program 133". The mini-game playing instructions 421 may be configured to implement the mini-game playing method 231 when executed by the CPU 131" of the mini-game playing system 109. The mini-game playing instructions 431 may include optional instructions for requesting a mini-game 433, instructions for receiving mini-game data 435, and instructions for playing a mini-game game 437. The mini-game playing instructions may optionally include instructions for determining an endpoint or trophy points.

Aspects of the present disclosure allow for methods and systems that facilitate generation and distribution of mini-games by game players who know and love them the most. It is noted that certain aspects described above are included for the purposes of example and are not intended to be limiting. For example, it is possible to combine the functions of two or more of the mini-game generator 102, mini-game distribution system 107, and mini-game playing system into a single device. This would allow users to generate, distribute and play mini-games, e.g., with their own gaming console system, portable game system, smartphone, personal computer, laptop, tablet computer, etc.

In addition, it is noted that certain aspects of the present disclosure are described in terms of software implemented by programmable processors. Again, this is not to be taken in a limiting sense. Alternatively, the methods described herein may be implemented by specially configured hardware, e.g., hardware that can interact with a gaming console system, portable game system, smartphone, personal computer, laptop, tablet computer, and the like through a universal serial bus (USB) interface or similar interface.

According to additional aspects of the present disclosure a replay of a mini-game may be made with only a thin input channel. Starting from a snapshot, a script could be written to only record the video and button presses that comprise the game inputs from a person playing the game. Therefore, the replay may be made by simply starting from the original snapshot and playing back the recorded game inputs. This replay method is possible with a deterministic emulator because the emulator will always go through the same sequence of operations when the same game inputs are provided to the emulator.

According to additional aspects of the present disclosure an emulated game may be pre-loaded in order to make the game begin as soon as a user initiates the game. Game players may access the games over a cloud. A server that hosts the titles may create a pre-build buffer so that the server is ready to go as soon as the user clicks "play".

For example, a game may be loaded when a cursor is hovering over a certain game selection on a startup screen. The cloud system could base the decision to load the game on a prediction engine. The prediction engine may predict demand and initiate a sufficient number of host machines to meet the demand. The predictions may be based on what pages users are hovering over or historical data for the demand load for a given game title, e.g., certain game titles may historically have a big demand when school gets out.

As may be seen from the foregoing, embodiments of the present invention allow for the increased utility of games through the generation of mini-games by game users themselves and by the distribution and play of such user-generated mini-games. Mini-games can be quickly and easily generated without having to expend the resources required for creating an entirely new game. This provides game players with the benefit of shorter gaming experiences for games in which they are already familiar.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer-implemented method for generating a mini-game, comprising:
    recording gameplay of a game on a computer game system;
    receiving a signal to generate said mini-game, and responsive to said signal suspending play of the game;
    identifying a start point and an end point for the mini-game from the recorded game, and using said start point and said end point for generating executable instructions to enable play of the mini-game;
    saving a portion of said recorded game corresponding to said start point and said end point along with said generated executable instructions to a cloud, the cloud including at least one server to enable access to the mini-game to view the portion of said recorded game and access to said generated executable instructions;
    wherein selection of the generated executable instructions enables interactive gameplay of the mini-game.

2. The computer-implemented method of claim 1, wherein said start point is selectable by rewinding via an interface, the start point corresponds to a place of interactivity in the game.

3. The computer-implemented method of claim 1, wherein state data is stored during the gameplay of the game, the state data is used for generating the executable instructions for running the mini-game when selected for interactive game play.

4. The computer-implemented method of claim 1, wherein the signal to generate said mini-game is responsive to button press of a controller used for playing the game.

5. The computer-implemented method of claim 1, wherein the start point is used to generate a snapshot in the game, the snapshot is associated with game state data to enable restarting of the game from the snapshot.

6. A computer-implemented method for generating a mini-game, comprising:
    recording gameplay of a game on a computer game system;
    receiving a signal to generate said mini-game, and responsive to said signal suspending play of the game;
    identifying a start point and an end point for the mini-game from the recorded game, and using said start point and said end point for generating executable instructions to enable play of the mini-game;
    saving said generated executable instructions to a distribution system, the distribution system including at least one server to enable access to the mini-game to access said generated executable instructions;
    wherein selection of the generated executable instructions enables interactive gameplay of the mini-game.

7. The computer-implemented method of claim 6, wherein said start point is selectable by rewinding via an interface controlled by a controller, the start point corresponds to a place of interactivity in the game.

8. The computer-implemented method of claim 6, wherein state data is stored during the gameplay of the game, the state data is used for generating the executable instructions for running the mini-game when selected for interactive game play, wherein gameplay of the mini-game is by a player other than a player that caused the generation of the mini-game.

9. The computer-implemented method of claim 6, wherein the signal to generate said mini-game is responsive to button press of a controller used for playing the game.

10. The computer-implemented method of claim 6, wherein the start point is used to generate a snapshot in the game, the snapshot is associated with game state data to enable restarting of the game from the snapshot.

* * * * *